United States Patent [19]
Monahan et al.

[11] Patent Number: 5,927,456
[45] Date of Patent: Jul. 27, 1999

[54] TWO-WAY OVER-RUNNING CLUTCH ASSEMBLY

[75] Inventors: Russell E. Monahan, Ann Arbor; Jonathan M. Adler, Dexter; Scott A. Wojan, Novi; Robert W. Frayer, Jr., Gregory, all of Mich.

[73] Assignee: NTN Corporation, Osaka, Japan

[21] Appl. No.: 08/742,720

[22] Filed: Nov. 1, 1996

[51] Int. Cl.⁶ ........................................ F16D 3/34
[52] U.S. Cl. ................................... 192/38; 192/45
[58] Field of Search ........................ 192/38, 44, 45, 192/54.1, 50, 49

[56] References Cited

U.S. PATENT DOCUMENTS

| | | |
|---|---|---|
| 3,055,471 | 9/1962 | Warn et al. . |
| 3,123,169 | 3/1964 | Young et al. . |
| 3,388,779 | 6/1968 | Roper ........................................ 192/44 |
| 3,414,096 | 12/1968 | Reed . |
| 3,476,226 | 11/1969 | Massey ..................................... 192/44 |
| 3,788,435 | 1/1974 | Prueter ................................. 192/44 X |
| 4,222,472 | 9/1980 | Telford . |
| 4,226,315 | 10/1980 | Kagata . |
| 4,238,014 | 12/1980 | Petrak . |
| 4,531,620 | 7/1985 | Stone . |
| 5,036,939 | 8/1991 | Johnson et al. . |
| 5,135,084 | 8/1992 | Ito et al. . |
| 5,178,250 | 1/1993 | Ashikawa ................................. 192/38 |
| 5,269,399 | 12/1993 | Ito et al. . |
| 5,307,911 | 5/1994 | Robinson .............................. 192/38 X |
| 5,542,515 | 8/1996 | Richardson et al. ...................... 192/44 |

*Primary Examiner*—John A. Jeffery
*Assistant Examiner*—Marcus Charles
*Attorney, Agent, or Firm*—Harness, Dickey & Pierce, P.L.C.

[57] ABSTRACT

A clutch assembly having driving and driven members with concentric cylindrical surfaces and which are independently rotatable about a common axis. A plurality of recesses are formed in the cylindrical surface of the driving member. The recesses include ramp surfaces which extend to the cylindrical surface. Roller elements are positioned in each of the recesses and a retainer, which is also independently rotatable about the axis, circumferentially interconnects the roller elements together. The retainer causes the rollers to move substantially in unison with one another and a biasing member individually biases each roller element into its respective recesses. During relative acceleration of the driving member relative to the driven member, the roller elements move along and up the ramp surfaces to a position where they become wedged between the driving and driven members. When wedged, torque can be transferred through the clutch assembly.

36 Claims, 3 Drawing Sheets

TWO-WAY OVER-RUNNING CLUTCH ASSEMBLY

BACKGROUND OF THE INVENTION

1. Field of the Invention

The present invention relates to a clutch assembly which engages upon positive torque being provided by an input member to transfer the torque to an output member. More specifically, the present invention relates to a two-way over-running clutch assembly of a roller/ramp variety and the mechanism by which the rollers are retained and biased in the assembly.

2. Description of the Prior Art

Roller/ramp clutch assemblies are used in a wide variety of applications. One possible application is an automatic locking hub of a four-wheel drive vehicle. During operation of four-wheel drive vehicles, it is often desirable to disconnect the alternate drive wheels (usually the front wheels) of the vehicle from the remainder of the drive train. When disconnected, the alternate drive wheels can rotate freely with respect to the drive train and, accordingly, they are free to rotate without regard to the rotational speed of the drive train. At other times, it is preferred that the alternate drive wheels of the vehicle automatically lock to the drive train whenever there is relative disproportional rotation between the alternate drive wheels and the input member from the drive train. The above clutch assemblies have also been provided where the clutch assembly transfers torque in only one direction and where the torque can be transferred in two directions.

Currently, vehicles with part time four-wheel drive systems generally use one of three mechanisms to engage the alternate drive wheels, which are usually the front wheels. One mechanism is the center disconnect system. In this system, a spline coupling is actuated by a vacuum diaphragm, electrical solenoid or other system to connect and disconnect the front half-shafts together. When disconnected, relative movement between the inboard and outboard sides of the spline coupling is possible and no power is transmitted between them. When engaged, however, the axle is effectively solid and torque inputted through the drive shaft into the differential will be split between the front wheels. While this system is inexpensive, its drawbacks include noise when disengaged and high parasitic losses because the half shafts and differential are continuously driven by the rotating alternate drive wheels when the coupling is not engaged.

A second mechanism is the wheel end disconnect system. These systems use a spline coupling, similar to that discussed above, at the wheel end to connect and disconnect the half shaft from the wheel. The expense of this system is greater than the center disconnect system because it requires a separate clutching mechanism at each wheel. However, parasitic losses are lower and better fuel economy results. If of a manually actuated variety, the mechanism cannot be shifted during operation of the vehicle. Instead, the operator must stop the vehicle and engage the hub lock from outside the vehicle. For some vehicle owners this is inconvenient, but for others it is a desirable inconvenience because of its reliability over automatic systems of the same general type.

Another type of clutch assembly does not utilize a splined engagement. Rather, concentric driving and driven members are provided with the driving member having axial surfaces which face radially toward the other member. Upon each surface, a roller is loosely held. These assemblies are referred to as roller/ramp clutch assemblies. The rollers are inertially responsive to acceleration of the driving member and when rotational acceleration of the driving member occurs, the inertia of the rollers causes them to move along the surfaces toward a side edge of the surfaces. At the side edge, the distance between these surfaces and the driven member is less than the diameter of the roller and the roller contacts the driven member becoming engaged or locked in the wedge formed between the axial surfaces of the driving member and the circumference of the driven member. In some varieties, the rollers can move along the axial surfaces to either side. In other varieties, engagement with the driven member is only possible by movement of the roller to one side of the surface.

In these latter systems, however, complex mechanisms are used to retain the rollers into the grooves. The mechanisms have also generally failed to ensure that the rollers will engage between the driving and the driven members at the same time. Failure to provide for substantially simultaneous engagement results in disproportionate stresses being applied to the rollers, the driving member and the driven member. Additionally, non-simultaneous engagement of the rollers has the effect of making the engagement and disengagement more noticeable during operation of the vehicle.

Prior designs have also used a common biasing member to bias all of the rollers of the assembly to the center of the respective surfaces. As a result, greater biasing forces are required and a failure of the biasing member results in all of the rollers of the assembly being negatively affected.

It is to this latter type of assembly that the present invention particularly relates.

In view of the foregoing limitations and shortcomings of the prior art devices, as well as other disadvantages not specifically mentioned above, it should be apparent that there still exists a need in the art for an improved roller/ramp clutch assembly.

A primary object of this invention is therefore to fulfill that need by providing an over-running clutch assembly which ensures substantially simultaneous engagement and disengagement of the roller elements between the driving and driven members.

Another object of the present invention is to provide an overrunning clutch assembly which allows for independent biasing of the individual roller elements.

A further object of this invention is to provide an over-running clutch assembly which allows for two-way torque transfer/operation of the assembly.

SUMMARY OF THE INVENTION

Briefly described, these and other objects are accomplished according to the present invention by providing a two-way, over-running clutch assembly having a roller/ramp design. The assembly includes independently rotatable first and second members, either of which can function as the driving or driven members. The members have opposing cylindrical surfaces, are concentric about a central axis and define a gap between them.

Formed in one of the cylindrical surfaces is a series of recesses. The recesses are open in the direction of the opposing cylindrical surface and equidistantly spaced around the circumference of the cylindrical surface. Their sloping sides also form ramps or ramp surfaces that extend up both sides from the valley of the recess to the cylindrical surface of the respective member.

Located between the first and second members are roller elements, one roller element being located within each recess. A retainer circumferentially interconnects all of the rollers together so that they can rotate about the central axis independently of the first and second members. By utilizing the retainer, the rollers can all substantially move circumferentially in unison and, therefore, the rollers can engage and disengage between the members in unison.

The particular ramp which the rollers will move up depends on the direction of acceleration of the driving member. As the rollers move up the ramps, they eventually rise out of the recesses a distance which is sufficient enough to span across the gap between the members and engage the opposing cylindrical surface. When engaged, the rollers become wedged between the driving and driven members and this results in torque being transferred between the members through the clutch assembly.

The rollers are also independently biased into the recesses by a biasing mechanism which is attached to or integral with the retainer. In one embodiment the biasing is provided by resilient tabs that engage the lateral sides of the rollers. In another embodiment, the rollers are biased by the interaction of springs (supported on the retainer) with ribs (that hold the rollers in place on the retainer).

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENT

Figure 1:
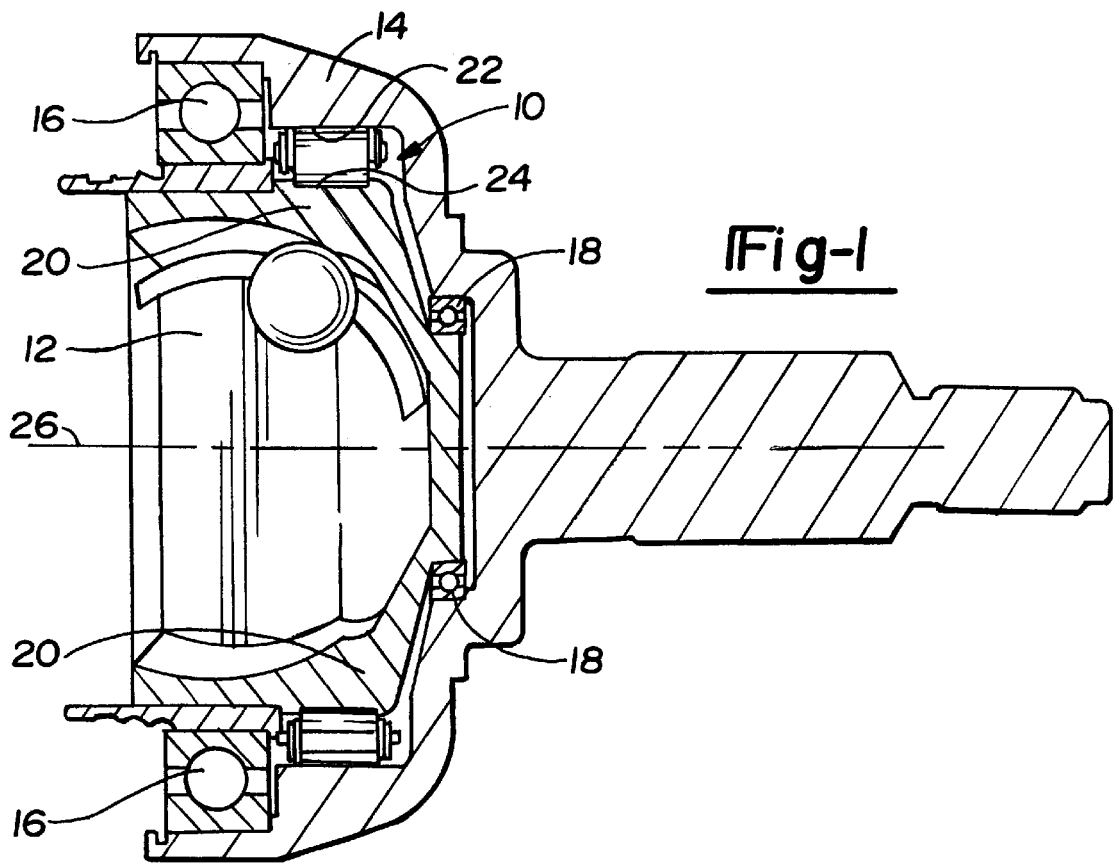
FIG. 1 is a cross sectional view illustrating an embodiment of the over-running clutch assembly of the present invention in the environment of a constant velocity joint, where the recesses would be formed on the radially inner member.

Referring now in detail to the drawings, there is shown in FIG. 1 an assembly 10 embodying the principles of the present invention. In this figure, the assembly 10 is incorporated into a constant velocity joint (CVJ) 12 having a typical ball joint design. While illustrated in connection with a CVJ, it will be apparent and understood to persons skilled in the art that the over-running clutch assembly 10 of the present invention has applicability to any mechanical system which includes a two-way overrunning clutch. That is any system which can be engaged in forward or reverse by applying torque on an input member but which allows over-running the output member if there is no input. Some examples of potential applications include, but are not limited to, conveyor line drive systems where articles are driven along or allowed to slide freely down the conveyor line and paper feed mechanisms for copiers and printers.

Further referring to FIG. 1, a first member or outer race 14 of the assembly 10 is provided as an outer clutch housing in the illustrated environment. The outer race 14 is supported by inboard support bearing 16 and an outboard support bearing 18 for rotation about a second member or inner race 20 of the assembly 10. In the illustrated environment, the inner race 20 is the outer race of the CVJ 12. Since CVJs are well known in their construction and since the details of the CVJ 12 are not necessary to a proper understanding of the present invention, the CVJ 12 is not being described in greater detail herein. Rather, the discussion will focus on those aspects of the present invention which would be commonly employed, regardless of the particular application.

Respectively formed in the outer and inner races 14, 20 are a pair of opposed cylindrical surfaces 22, 24, which are herein referred to as the outer cylindrical surface 22 and the inner cylindrical surface 24. Since the outer race 14 and the inner race 20 are mounted for independent rotation about a common axis 26, the outer and inner cylindrical surfaces 22, 24 are likewise independently rotatable about that axis 26 and are concentric with respect to one another.

Figure 2:
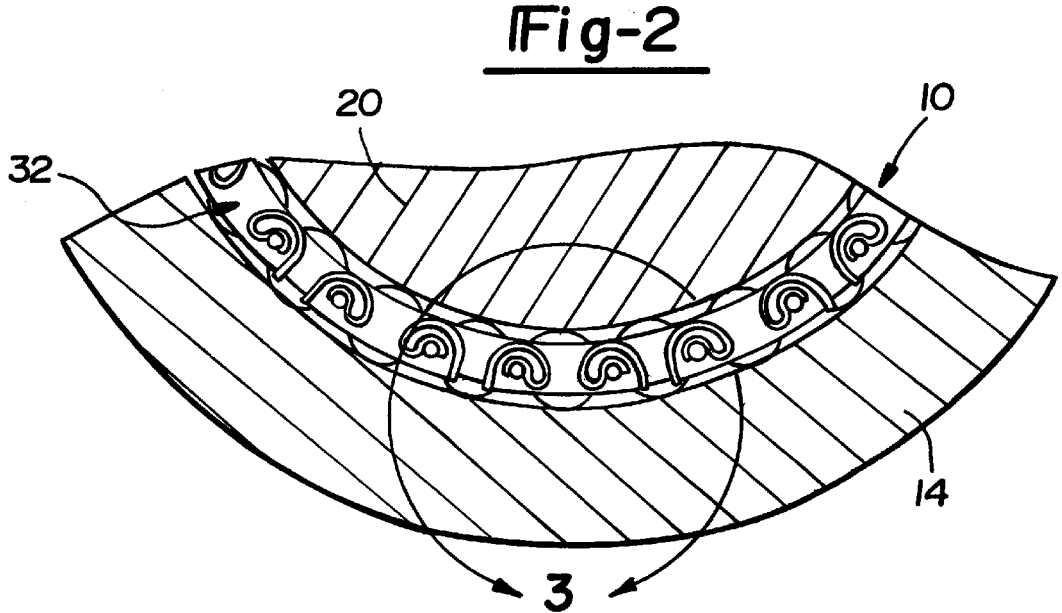
FIG. 2 is a partial sectional view of another embodiment of the present invention and showing the rollers in an engaged condition.
Figure 3:
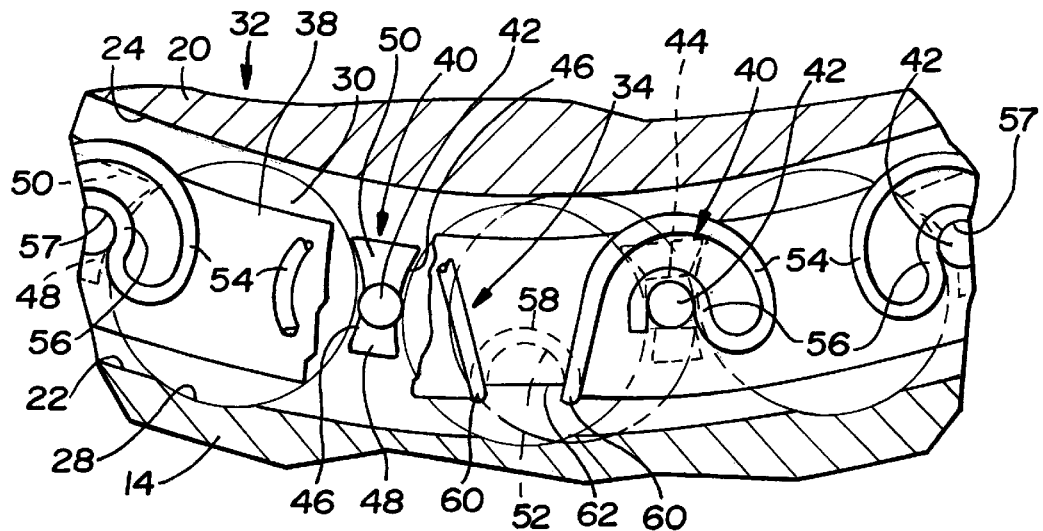
FIG. 3 is an enlarged view taken substantially from within circle 3—3 of FIG. 2 particularly illustrating the recesses being formed in an outer cylindrical surface and the rollers being biased radially outward.

A series of axially oriented recesses 28 are formed in one of the cylindrical surfaces 22, 24. As seen in FIGS. 2 and 3, the recesses 28 can be formed in the outer cylindrical surface 24. FIGS. 1, 5, 6 and 7 show recesses being formed in the inner cylindrical surface 24. Which of the members 14, 20 will have the recesses 28 depends on which member 14, 20 is to be the driving member of the system 10 and, therefore, it depends on the particular application of the present invention.

Located in each recess 28 and axially oriented with the groove 28 is a cylindrical roller element 30. A retainer 32 circumferentially connects the rollers 30 together and, in this manner, the rollers 30 are provided to move in unison with one another. The retainer 32 is also equipped to cause the rollers 30 to be biased radially into the recesses 28. Two alternative constructions are disclosed for the retainer 32. The first of these constructions is generally referred to as an "X-bar cage rib" design and uses a series of springs 34 to bias the rollers 30. The Xbar cage rib retainer 32 is generally illustrated in FIGS. 1, 2, 3, and 4. An alternative construction for the retainer, designated as retainer 32', is referred to as "band spring" design and utilizes resilient tabs 72 to bias the rollers 30 into the grooves 28. The band spring retainer design is illustrated in FIG. 5.

Figure 4:
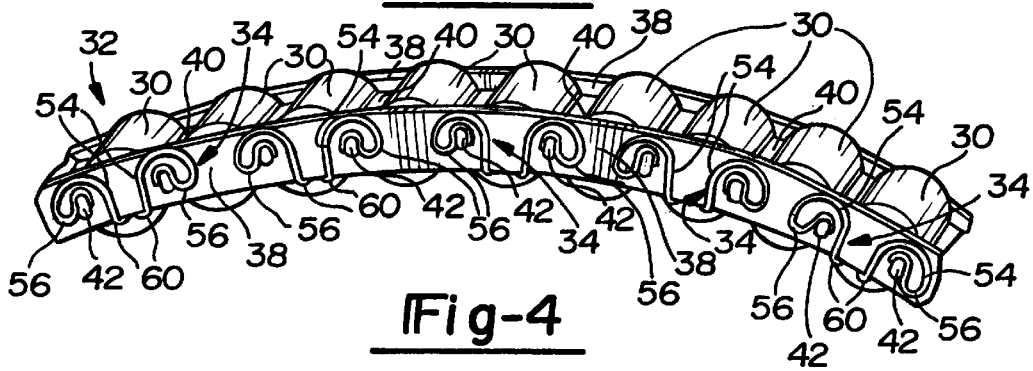
FIGS. 4 and 5 are a partial perspective views of two embodiments of retainers and rollers in accordance with the present invention and configured to bias the rollers radially inward.
Figure 5:
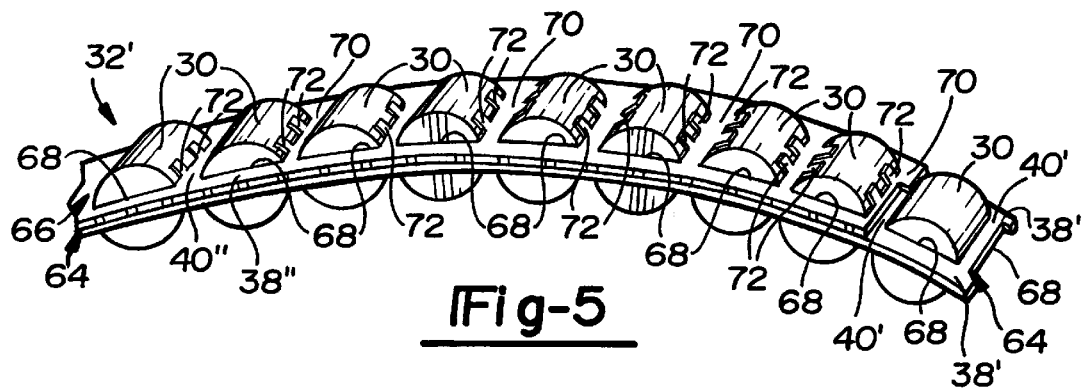

Referring now to the X-bar cage rib retainer 32 of FIG. 4, it is seen that the retainer 32 includes a pair of generally annular retainer rings 38 that are located on opposing ends of the rollers 30. Extending between the rings 38, and generally positioned between each adjacent roller 30, are a series of ribs 40. Projecting from both ends of the ribs 40 are tabs 42 and these tabs extend into slots 44 formed in the rings 38 to hold the ribs 40 in place. Instead of being tightly preened in place, the tabs 42 can slide within the slots 44. The shape of the slots 44 is such that the tabs 42 are circumferentially restrained, but can slide a limited distance in the radial direction. In this manner, the ribs 40 are correspondingly movable only a distance in the radial direction which is sufficient to allow the roller 30 to move from the bottom of recess 28 to where it is engaged between the races 14, 20.

The X-bar cage design derives its name from the shape of the ribs 40. As seen in FIG. 3, the ribs 40 include a series of planar lateral surfaces 46 which generally define a composite, inwardly curved shape so as to generally correspond with the shape of the rollers 30 and receive the rollers 30 therein. When viewed in cross section, the ribs 40 thus exhibit an X-shape and hence the name. Alternatively, the lateral surfaces 46 could themselves be curved.

The outer and inner sides 48, 50 of the ribs 40 are not the same size. Rather, one of the ribs 40 is generally formed with a larger width than the opposing side. Since the springs 34 cooperate with the ribs 40 to bias the rollers 30 into the recesses 28, the leading side of the ribs (the forward end relative to the direction of the applied bias) is smaller or narrower than the trailing side. Notably, the width or dimension across the radial face of the trailing side is greater than the minimum spacing between adjacent rollers 30. By providing the trailing side with its increased size, under the influence of the springs 34 the trailing side transfers the biasing force from the springs 34 to the rollers 30. In FIG. 3, since the recesses 28 are formed in the outer cylindrical surfaces 22 and the rollers 30 are biased radially outward, the inner sides 50 of the ribs 40 are larger than the outer sides 48. This condition is reversed when the rollers 30 are biased radially inward.

To mount the springs 34 onto the rings 38, a clipped engagement is used. Generally, the springs 34 include a pair of arms 54 which diverge laterally away from a center portion 52 and the outer ends of the arms 54 curve or bend approximately 180°. The terminal ends 56 of the arms 54 are doubled back into the 180° curvature of the arms 54 and are provided with a general S-shaped configuration. The tabs 42 of the ribs 40 are received in a distal bend 57 of the S-shaped ends 56 of the arms 54. The center portion 52 of the springs 34 includes a bight 58 which has been returnly bent about its ends 60 where the bight 58 merges with the arms 54. In this manner, the bight 58 forms a saddle allowing the center portion 52 to straddle the ring 38 positioning the bight 58 on one side of the ring 38 with the arms 54 being located on the opposing side of the ring 38. In this manner, the ribs 40 are radially biased when the spring 34 is mounted to the ring 38. A notch 62, seen in FIGS. 2 and 3 but omitted in FIG. 4, can be formed in the perimeter of the ring 38, at a location between the slots 44, to receive the ends 60 of the bight 58. The notch 62 thus allows for ready positioning of the springs 34 on the rings 38 and limits circumferential movement of the springs 34 along the rings 38 during use of the assembly 10.

Accordingly, when the springs 34 are clipped onto the rings 38, the saddle-like center portion 52 defined by the bight 58 and ends 60 rests in the perimeter notch 62 of the rings 38 while the distal bend 57 of the arms 54 is looped over the tabs 42 of the ribs 40 exerting a biasing force on the ribs 40 radially in the direction of the recesses 28.

In the alternative design of the retainer 32', two separate strips of sheet metal are fastened or secured together by well known methods such as welding or riveting. One of these strips defines a substrate 64 while the opposing strip defines a thinner spring strip 66. Both the substrate and the spring strip 64, 66 include cut-out portion 68 into which the rollers 30 are received. Depending upon whether the rollers 30 are to be biased radially inward or radially outward, the spring strip 66 is located on the opposing side of the substrate 64.

Resilient fingers 72 are provided on the spring strip 66 so as to extend into the cutouts 68 from both lateral sides of the cut-out 68. The fingers 72, being of a resilient, provide the biasing force against the rollers 30.

As seen in the embodiment of FIG. 4, the spring strip 66 is positioned radially outward of the substrate 64 and the rollers are biased radially inward by the fingers 72 which engage the rollers 30 when the rollers are positioned within the cut-outs 68. The substrate 64 is of a thicker and stiffer material than the spring strip 66 and provides rigidness to the retainer 32'. The spring strip 66 is of thin spring material which is more pliable than the substrate 64. This allows the fingers 72 to push on the rollers 30, radially into the recesses 28, with a light spring action that is necessary for optimum performance of the clutch assembly 10.

Figure 6:
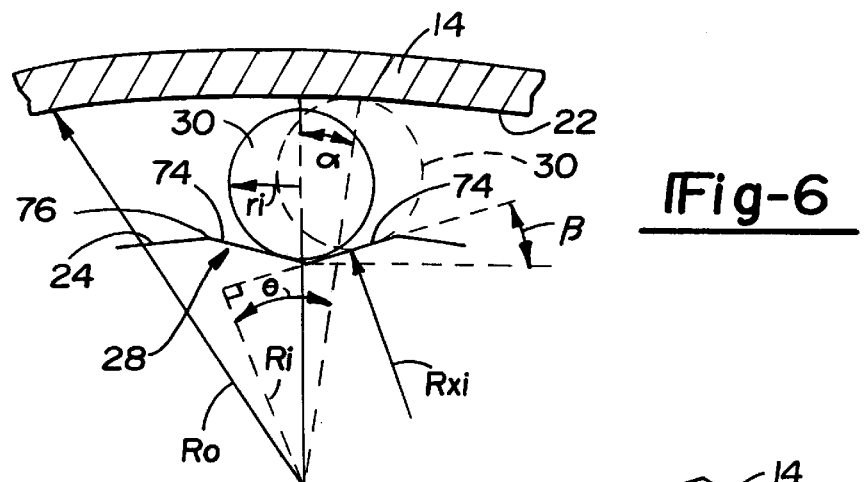
FIG. 6 illustrates the radially inward biasing of a roller in a recess in accordance to the present invention with the recess being formed in an inner cylindrical surface.
Figure 7:
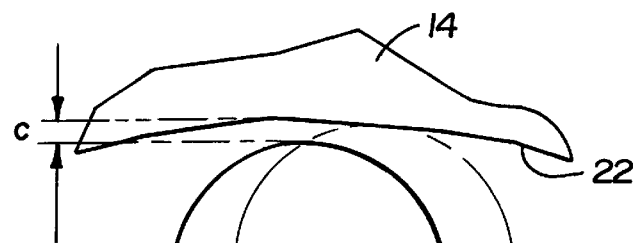
FIG. 7 is similar to FIG. 6 and illustrates the positioning of a roller in a recess having a different shape than that illustrated in FIG. 6.
Figure 8:
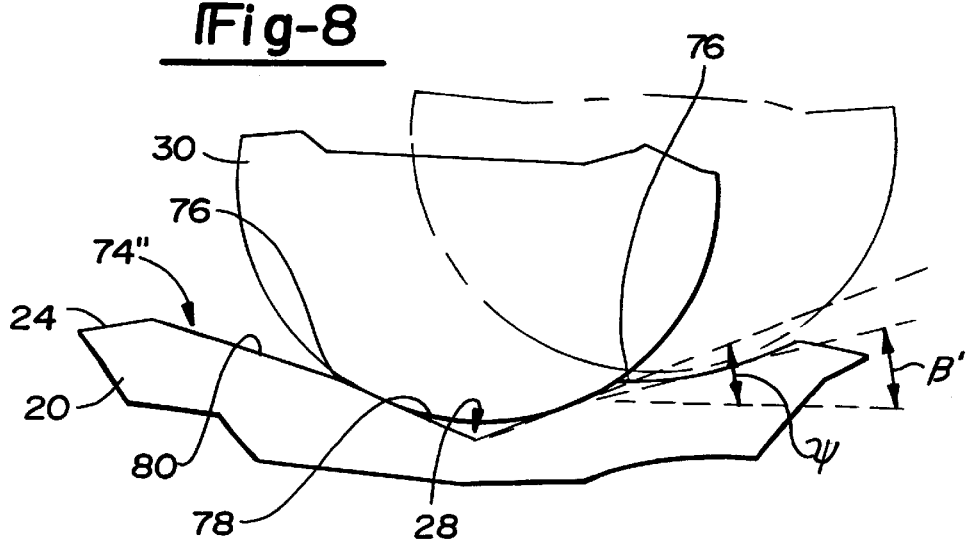
FIG. 8 is similar to FIGS. 6 and 7 and further illustrates another shape for a recess according to the present invention.

Utilizing either of the above retainers 32, 32', the rollers 30 are biased and held in the valleys or lowermost portions of the recesses 28 of the driving member. This is the normal disengaged position of the clutch assembly 10. The light spring force holding the rollers 30 radially into the recesses 28 can be overcome as a result of an angular acceleration of the driving member and the inertia of the retainer 32, 32' and rollers 30. In FIG. 3, the driving member is the outer race 14 while the driven member is the inner race 20. In FIGS. 6–8, the driving and driven members are reversed. In all the figures, this angular acceleration can be in either direction of rotation.

Referring now to FIG. 6, acceleration of the driving member causes the recesses 28 to accelerate out from underneath the rollers 30 and forces the rollers 30 to roll up one of the recesses' shallow sloping sides or ramps 74 until contacting the opposing, inner cylindrical surface 24. Upon contact, the rollers 30 wedge between the cylindrical surface 22 and the ramps 74.

The wedging of a roller 30 between an outer cylindrical surface 22 and a recess 28 defined in an inner cylindrical surface 24 is generally illustrated in phantom in FIG. 6. The solid line roller element 30 in FIG. 6 illustrates the roller 30 when it has been biased into its nonengaged position within the recess 28. The ramps 74 of the recesses 28 are illustrated as being planar surfaces. Alternate configurations for the ramps 74 are illustrated in FIGS. 7 and 8, respectively, a single radius ramp 74' and dual radius ramp 74". The dual radius surface design was developed to maintain maximum clearance (c) between the roller 30 and cylindrical surface 22 opposing the recesses 28. This design provides the recesses 28 with a deeper "trough" into which the roller 30 rests when disengaged than that of the single radius design. In use, as the retainer 32 (or 32') and rollers 30 move circumferentially with respect to the ramps 74", the rollers 30 are forced out of the deeper trough and over a transition edge 76 between the two radius surfaces 78 and 80 and into engagement with the opposing cylindrical surface 22 and the shallower of the two radius surfaces 80. In this manner, an increased considerable clearance (c) can be gained between the disengaged roller 30 and the opposing cylindrical surface 22, while at the same time providing a shallow ramp angle $\beta'$ (e.g. 7° and being less than the steeper ramp angle $\psi$) for the shallower radius surface 80 which in turn provides for better engagement between the rollers 30 and the opposed cylindrical surface 22. Other alternatives for the shape of the recesses 28 include the recesses 28 being defined by more complex curved surfaces or by radial planar surfaces formed along a chord through the cylindrical surface.

An empirical relationship has been developed to predict the effect of various design parameters on the torque capacity of the clutch assembly 10. Generally, this relationship predicts the onset of brinnelling or plastic deformation of any of the contacting surfaces of the rollers 30, the inner or outer surfaces 22, 24 or the recesses 28. It has been found that the torque capacity of the clutch assembly 10 can be improved by increasing the effective length of the rollers 30, the number of locking rollers 30, the roller 30 diameter $r_i$, outer and inner race or cylindrical surfaces 22, 24 radii $R_o$ and $R_i$.

Similarly, the torque capacity of the clutch assembly 10 can be improved by decreasing the effective radius of curvature of the ramps (74, 74', or 74") which define the recesses 28, but only to the extent that it is not less than the radius of the opposing cylindrical surface. If the ramp angle β is increased, torque capacity is improved until β=arctan $\mu/2$ (wherein $\mu$=coefficient of friction) at which point the rollers cannot remain engaged effectively in the wedge between the opposing cylindrical surface and the ramp surfaces 22 and (74, 74', or 74"), causing the clutch assembly 10 to slip. For example, if $R_{xi}$, the radius of ramp surface (74, 74', 74") is changed from infinity (flat) to 62.5 mm, the radius of curvature of the outer cylindrical surface 22 ($R_o$), the torque capacity of the clutch mechanism can be increased 8.8%.

The ribs 40 used in the Xbar cage rib design provide for close positioning which is necessary for proper clutch 10 performance. The tabs 42 of the ribs 40 act both to guide radial movement in the clutch 10 and to provide an attachment point for the springs 34 which provide the radial force, urging the rollers 30 into the disengaged position of the assembly 10. As mentioned above, the tabs 42 fit through the slots 44 in the rings 38 and can slide radially, but are restrained circumferentially and axially. The center 52 of each "ram's horn spring" 34 is clipped under the rings 38 with the outer ends 56 of the arms 54 being looped over the tabs 42. This provides a soft radial force on the ribs 40. The lateral surfaces 46 of the ribs 40 contact the rollers 30, holding them loosely in place and, by virtue of the spring force, transfers the force to the rollers 30.

The retaining rings 38 are used in pairs with the ribs 40 placed perpendicular between the rings 38. This forms a circular ladder-like pattern which holds the rollers 30 in the recesses 28 around the outside of the cylindrical surface 22 in FIG. 3.

In the alternative design, the ribs 40 and retaining rings 38 are replaced with the band spring retainer 32'. This lower cost version features two strips 64, 66 of stamped steel/spring material bent into a circle to make the retainer 32'. The first strip, the substrate 64, is much thicker than the second, the spring strip 66, and both have openings 68 stamped therein which receive and hold the rollers 30 in place, both axially and circumferentially. As seen in FIG. 5, the thicker substrate 64, which provides strength and rigidity to the retainer 32', includes portions forming rings 38' (located adjacent to the ends of the rollers 30) and ribs 40' (extending between the rollers 30 to interconnect the rings 38'). The substrate 64 acts as the structural support, but its sheet metal stock is too thick to provide a proper spring force to the rollers. The thinner spring strip 66, in addition to having similar rings 38" and ribs 40", includes spring "fingers" 72 that provide a light, radial biasing force to the rollers 30 which is necessary for proper clutch performance. The fingers 72 extend from the ribs 40" generally into the openings 68 and contact the rollers 30 along the cylindrical sides of the rollers 30. To secure the substrate and band strips 64, 66 together, any one of a number of conventional securement techniques can be used. For example, the strips 64, 66 can be fastened together welding, riveting or clipping to mention only a few.

While the above description constitutes the preferred embodiment of the present invention, it will be appreciated that the invention is susceptible to modification, variation and change without departing from the proper scope and fair meaning of the accompanying claims.

We claim:

1. An over-running roller/ramp clutch assembly comprising:
   a driving member having a first cylindrical surface and being rotatable about an axis;
   a driven member having a second cylindrical surface coaxial with said first cylindrical surface and defining a gap therebetween, said driven member being rotatable about said axis with limited relative rotation with respect to said driving member;
   a plurality of ramp surfaces formed at spaced apart locations in said first cylindrical surface, said ramp surfaces defining a plurality of recesses in said cylindrical surface;
   a plurality of rollers positioned between said driving and driven members with one of said rollers being located within each of said recesses, said rollers having a diameter greater than said gap between said first and second cylindrical surfaces;
   a retainer interconnecting all of said rollers together and causing said rollers to circumferentially move in unison with one another, said retainer being rotatable about said axis with limited relative rotation with respect to said driving and driven members;
   a plurality of biasing means for radially and individually biasing each of said rollers into said recesses, each of the said biasing means being supported by said retainer; and
   wherein acceleration of said driving member with respect to said driven member moves said rollers along said ramp surfaces to a position where said rollers engage and wedge between said driving and driven members preventing relative rotation between said driving and driven members and thereby transferring torque through said clutch assembly.

2. The assembly as set forth in claim 1 wherein said first cylindrical surface is concentric with and generally opposes said second cylindrical surface.

3. The assembly as set forth in claim 1 wherein said driving member is located radially outward of said driven member.

4. The assembly as set forth in claim 1 wherein said driving member is located radially inward of said driven member.

5. The assembly as set forth in claim 1 wherein said recesses each include a pair of divergent ramp surfaces.

6. The assembly as set forth in claim 1 wherein said ramp surfaces are planar.

7. The assembly as set forth in claim 1 wherein each of said ramp surfaces are curved.

8. The assembly as set forth in claim 1 wherein each of said ramp surfaces are defined by at least two curved surfaces.

9. The assembly as set forth in claim 8 wherein said ramp surfaces are defined by at least two different radii of curvature.

10. The assembly as set forth in claim 1 wherein said retainer has an annular laddered construction with openings defined in said retainer, said rollers being located within openings.

11. The assembly as set forth in claim 1 wherein said retainer includes a pair of rings disposed at opposing ends of said rollers, a plurality of ribs extending between and connecting said rings together, one of said ribs being located between each adjacent one of said rollers, adjacent ribs cooperating to define an opening therebetween.

12. The assembly as set forth in claim 11 wherein said ribs include lateral surfaces for engaging said rollers.

13. The assembly as set forth in claim 12 wherein said lateral surfaces are planar.

14. The assembly as set forth in claim 13 wherein said lateral surfaces cooperate to generally define a concave composite surface.

15. The assembly as set forth in claim 11 wherein said ribs include a leading side and a trailing side, said leading side being generally adjacent to said driving member and said trailing side being generally adjacent to said driven member, said leading side having a width which is less than a width of said trailing side.

16. An over-running roller/ramp clutch assembly comprising:
- a driving member having a first cylindrical surface and being rotatable about an axis;
- a driven member having a second cylindrical surface coaxial with said first cylindrical surface and defining a gap therebetween, said driven member being rotatable about said axis with limited relative rotation with respect to said driving member;
- a plurality of ramp surfaces formed at spaced apart locations in said first cylindrical surface, said ramp surfaces defining a plurality of recesses in said cylindrical surface, said ribs being radially movable with respect to said rings; and
- a plurality of biasing means for radially and individually biasing each of said rollers into said recesses, said biasing means being supported by said retainer; and
- wherein acceleration of said driving member with respect to said driven member moves said rollers along said ramp surfaces to a position where said rollers engage and wedge between said driving and driven members preventing relative rotation between said driving and driven members and thereby transferring torque through said clutch assembly.

17. An overrunning roller/ramp clutch assembly comprising:
- a driving member having a first cylindrical surface and being rotatable about an axis;
- a driven member having a second cylindrical surface coaxial with said first cylindrical surface and defining a gap therebetween, said driven member being rotatable about said axis with limited relative rotation with respect to said driving member;
- a plurality of ramp surfaces formed at spaced apart locations in said first cylindrical surface, said ramp surfaces defining a plurality of recesses in said cylindrical surface;
- a plurality of rollers positioned between said driving and driven members with one of said rollers being located within each of said recesses, said rollers having a diameter greater than said gap between said first and second cylindrical surfaces;
- retainer means for interconnecting all of said rollers together and causing said rollers to circumferentially move in unison with one another, said retainer means being rotatable about said axis with limited relative rotation with respect to said driving and driven members; said retainer means including a pair of rings disposed at opposing ends of said rollers, a plurality of ribs extending between and connecting said rings together, one of said ribs being located between each adjacent one of said rollers, adjacent ribs cooperating to define an opening therebetween, said ribs being radially movable with respect to said rings; and
- a plurality of biasing means for radially and individually biasing said rollers into said recesses, said biasing means being supported by said retainer means, said biasing means including spring members mounted to said rings and engaging said ribs such that said ribs cause said rollers to be radially biased into said recesses.

18. The assembly as set forth in claim 17 wherein said springs are mounted onto said retainer means by clipping said springs thereon.

19. The assembly as set forth in claim 17 wherein said springs include an arm having a distal end which engages said ribs, said arm defining a curved portion with said distal end being bent back into a curve defined by said curved portion.

20. The assembly as set forth in claim 19 wherein said distal end of said arm is S-shaped.

21. The assembly as set forth in claim 20 wherein said distal end engages said ribs in a distal bend of said S-shape.

22. The assembly as set forth in claim 11 wherein said ribs are unitarily formed with said rings.

23. The assembly as set forth in claim 22 wherein said retainer means is formed of sheet metal.

24. An over-running roller/ramp clutch assembly comprising:
- a driving member having a first cylindrical surface and being rotatable about an axis;
- a driven member having a second cylindrical surface coaxial with said first cylindrical surface and defining a gap therebetween, said driven member being rotatable about said axis with limited relative rotation with respect to said driving member;
- a plurality of ramp surfaces formed at spaced apart locations in said first cylindrical surface, said ramp surfaces defining a plurality of recesses in said cylindrical surface;
- a plurality of rollers positioned between said driving and driven members with one of said rollers being located within each of said recesses, said rollers having a diameter greater than said gap between said first and second cylindrical surfaces;
- a retainer interconnecting all of said rollers together and causing said rollers to circumferentially move in unison with one another, said retainer being rotatable about said axis with limited relative rotation with respect to said driving and driven members, said retainer including a pair of rings disposed at opposing ends of said rollers and a plurality of ribs extending between and connecting said rings together, one of said ribs being located between each adjacent one of said rollers, adjacent ribs cooperating to define an opening therebetween, said ribs being unitarily formed with said rings;
- a plurality means biasing means for radially and individually biasing each of said rollers into said recesses, said biasing means being supported by said retainer; and
- wherein acceleration of said driving member with respect to said driven member moves said rollers along said ramp surfaces to a position where said rollers engage and wedge between said driving and driven members preventing relative rotation between said driving and driven members and thereby transferring torque through said clutch assembly, each of the said biasing means includes a second pair of rings located at opposing ends of said rollers and second ribs being unitarily formed with said second rings and defining second openings in said biasing means within which said rollers are received.

25. The assembly as set forth in claim 24 wherein said biasing means includes resilient fingers extending from said biasing means into said openings, said fingers engaging said rollers and providing a biasing force thereto.

26. The assembly as set forth in claim 25 wherein said fingers extend off of said ribs.

27. An over-running roller/ramp clutch assembly comprising:

a driving member having a first cylindrical surface and being rotatable about an axis;

a driven member having a second cylindrical surface coaxial with said first cylindrical surface and defining a gap therebetween, said driven member being rotatable about said axis with limited relative rotation with respect to said driving member;

a plurality of ramp surfaces formed at spaced apart locations in said first cylindrical surface, said ramp surfaces defining a plurality of recesses in said cylindrical surface;

a plurality of rollers positioned between said driving and driven members with one of said rollers being located within each of said recesses, said rollers having a diameter greater than said gap between said first and second cylindrical surfaces;

retainer means for interconnecting all of said rollers together and causing said rollers to circumferentially move in unison with one another, said retainer means being rotatable about said axis with limited relative rotation with respect to said driving and driven members, said retainer means including a first pair of rings disposed at opposing ends of said rollers, a plurality of first ribs extending between and connecting said first rings together, one of said first ribs being located between each adjacent one of said rollers, adjacent first ribs cooperating to define an opening therebetween, said first ribs being unitarily formed with said first rings;

biasing means for radially and individually biasing said rollers into said recesses, said biasing means being supported by said retainer means, said a plurality of biasing means including a pair of second rings located at opposing ends of said rollers and second ribs being unitarily formed with said second rings, said second ribs defining second openings in said biasing means within which said rollers are received, each of the said biasing means including resilient fingers extending from said biasing means into said openings, said fingers engaging said rollers and providing a biasing force thereto, said fingers extending generally radially outward and away from said axis; and wherein acceleration of said driving member with respect to said driven member moves said rollers along said ramp surfaces to a position where said rollers engage and wedge between said driving and driven members preventing relative rotation between said driving and driven members and thereby transferring torque through said clutch assembly.

28. The assembly as set forth in claim 25 wherein said fingers bend generally radially inward toward said axis.

29. The assembly as set forth in claim 24 wherein said fingers are unitarily formed with said ribs and said rings of said biasing means.

30. The assembly as set forth in claim 29 wherein said biasing means is formed of sheet metal.

31. The assembly as set forth in claim 24 wherein said biasing means is secured to said retainer means by fasteners.

32. The assembly as set forth in claim 24 wherein said biasing means is secured to said retainer means by welding.

33. The assembly as set forth in claim 24 wherein said biasing means and said retainer means are formed of sheet metal strips having first and second thicknesses, said strips being bent into an annular construction.

34. The assembly as set forth in claim 33 wherein said thickness of said sheet metal strip forming said biasing means is less than said thickness of said sheet metal strip forming said retainer means.

35. The assembly as set forth in claim 33 wherein said biasing means is located radially inward of said retainer means.

36. The assembly as set forth in claim 33 wherein said biasing means is located radially outward of said retainer means.

* * * * *

UNITED STATES PATENT AND TRADEMARK OFFICE
CERTIFICATE OF CORRECTION

PATENT NO. : 5,927,456
DATED : July 27, 1999
INVENTOR(S) : Monahan, et al

It is certified that error appears in the above-identified patent and that said Letters Patent is hereby corrected as shown below:

Column 10, Claim 24, Line 63; after "plurality" delete "means" and insert --of--

Column 12, Line 3, Claim 27; move "a plurality of" to the beginning of paragraph (Line 1)

Signed and Sealed this

First Day of February, 2000

*Attest:*

*Attesting Officer*

Q. TODD DICKINSON

*Acting Commissioner of Patents and Trademarks*